United States Patent Office 2,721,570
Patented Oct. 25, 1955

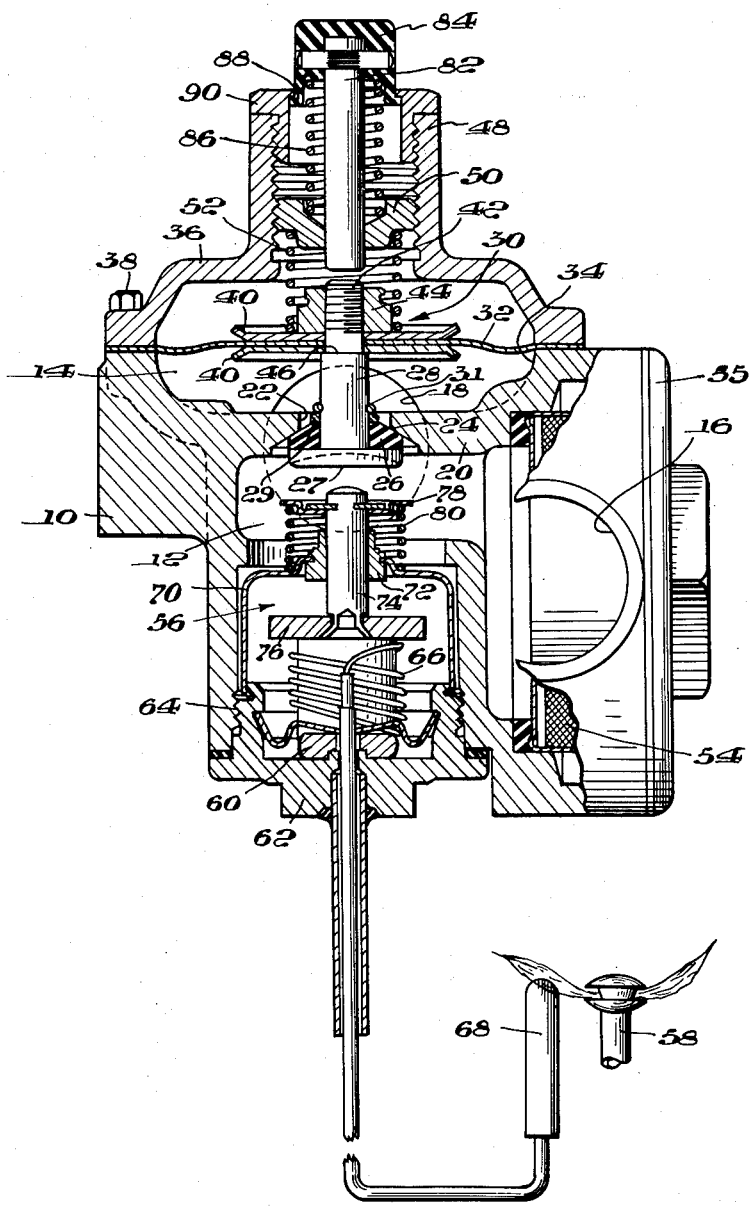

2,721,570

COMBINED PRESSURE REGULATOR AND AUTOMATIC PILOT CONTROL

Michael J. Caparone, Arcadia, and Theodore J. Dykzeul, Compton, Calif., assignors to Robertshaw-Fulton Controls Company, Greensburg, Pa., a corporation of Delaware Application August 2, 1952, Serial No. 302,432

6 Claims. (Cl. 137—66)

This invention relates to combination controls for gaseous fuel burners wherein a pressure regulating device and a flame failure cut-off both operate upon a single control valve.

The present invention is characterized by a single control valve which is normally free to be moved between controlling positions by a pressure responsive device. An electromagnet having an armature separable therefrom is adapted to be energized by a thermoelectric device and when so energized will retain the armature in engagement with the pole faces thereof. However, when the thermoelectric device cools and no longer provides sufficient current to energize the electromagnet, the armature is released and moves under spring bias into engagement with the control valve to move the same to closed position.

The provision of a single valve for dual control purposes provides a safeguard against sticking valves which may occur where a separate cut-off valve is provided and infrequently operated.

It is a principal object of this invention to utilize a single valve to regulate pressure and to terminate fluid flow upon the occurrence of a predetermined condition.

Another object of this invention is to actuate a valve in response to pressure conditions and to control the operation of the valve in response to a predetermined temperature condition.

Other objects and advantages will appear from the following specification taken in connection with the accompanying drawing which is a sectional view of a control device embodying this invention.

Referring more particularly to the drawing, the control is shown as comprising a casing 10 having an inlet passage 12 and an outlet passage 14. An inlet opening 16 formed in the casing 10 provides communication between a source of fuel supply (not shown) and the inlet passage 12. Communication is provided between the outlet passage 14 and the burner of a refrigerator or other appliance (not shown) through an outlet opening 18 formed in the casing 10.

The interior of the casing 10 is shaped to provide a partition 20 which separates the inlet passage 12 from the outlet passage 14, communication being permitted therebetween through a valve port 22 formed in the partition 20. One edge of the port 22 defines a valve seat 24 cooperable with an annular valve element 26 to control fuel flow between the inlet opening 16 and the outlet opening 18. The valve element 26 is secured to one end of a valve stem 28, being clamped between a flanged end 27 of the stem and a washer 29 which is held against axial movement of the stem by a snap ring 31. The valve stem 28 extends through the valve port 22 and means responsive to fluid pressure in the outlet passage 14 is provided for moving the same to move the valve element 26 toward and away from the valve seat 24, this means being indicated generally by the reference numeral 30.

The pressure responsive means 30 is here shown as comprising a flexible diaphragm 32 which extends across a control port 34 formed in the wall of the casing 10 and opening into the outlet passage 14. The edge of the diaphragm 32 is clamped between the casing 10 and a generally cup-shaped member 36 which is secured to the casing 10 by a plurality of bolts 38, only one of which is shown. Leakage of fuel from the casing 10 through the control port 34 is thus prevented.

An annular diaphragm reinforcing element 40 is disposed on each side of the diaphragm 32 and a reduced end 42 of the valve stem 28 extends therethrough. The valve stem 28 is secured to the diaphragm 32 by a nut 44 which is threaded on the reduced end 42 of the valve stem 28 to clamp the diaphragm reinforcing elements 40 and the diaphragm 32 between a shoulder 46 formed on the valve stem 28 and one face of the nut 44.

Formed on the bottom wall of the cup-shaped member 36 is an elongated hollow shank 48 which opens into the interior of the cup-shaped member 36. The shank 48 is in axial alignment with the valve stem 28 and is internally threaded to receive an externally threaded annular element 50. The annular element 50 serves as a support for a spring 52 which acts between the same and one diaphragm reinforcing element 40 to bias the diaphragm 32 and valve stem 28 downward as viewed in the drawing and thereby bias the valve element 26 away from the valve seat 24.

The apparatus thus far described constitutes a pressure regulating device operable to maintain a predetermined pressure in the outlet passage 14. In operation, an increase in fluid pressure in the outlet passage 14 acts upon the diaphragm 32 to move the same against the bias of the spring 52 to thereby move the valve element 26 toward the valve seat 24. Such movement of the valve element 26 will cause fluid flow through the valve port 22 to be throttled and a decrease in fluid pressure in the outlet passage 14 will result. Conversely, a decrease in fluid pressure in the outlet passage 14 will permit the diaphragm 32 and associated valve element 26 to move downward as viewed in the drawing under the bias of the spring 52 to thereby move the valve element 26 away from the valve seat 24 to decrease the throttling action and increase the fluid pressure in the outlet passage 14.

It will thus be apparent that the bias of the spring 52 will control the prevailing pressure within the outlet passage 14 and, as is customary in such devices, adjustment of the spring supporting annular element 50 axially of the shank 48 will adjust the bias of the spring 52 to thereby set the pressure to be maintained within the outlet passage 14.

Interposed in the inlet passage 12 between the inlet opening 16 and the valve port 22 is a filter 54 of any suitable form which is adapted to remove impurities from fuel flowing through the control device. The filter 54 may be removed for service through a suitable aperture formed in the casing 10 and closed by a cap 55 threaded therein.

In order that the valve element 26 may move in response to a condition other than outlet pressure, condition responsive means, indicated generally by the reference numeral 56, is positioned in the inlet passage 12 and arranged to hold the valve element 26 against the valve seat 24 upon the occurrence of the predetermined condition. This means is here shown as comprising an electromagnetic device operable in response to failure of a flame at a pilot burner 58.

More particularly, the electromagnetic device 56 comprises a U-shaped magnet core 60 with the bight thereof secured to a cap 62 threaded into a suitable opening 64 formed in the casing 10 in substantial alignment with the valve port 22.

Wound on each leg of the magnet core 60 is a coil 66 adapted to be energized by a thermoelectric generator here shown as a thermocouple 68 positioned to be heated by a flame emanating from the pilot burner 58.

Carried by the cap 62 is a housing 70 which extends into the casing 10 and supports a bearing 72. An armature stem 74 is slidably mounted in the bearing 72 and carries on one end thereof an armature 76 engageable with the pole faces of the magnet core 60. The other end of the armature stem 74 carries a collar 78 and a spring 80 acting between the collar 78 and the housing 70 serves to bias the assembly of the armature stem 74 and the armature 76 away from the pole faces of the magnet 60 to a released position.

In released position, the armature stem 74 engages the flanged end 27 of the valve stem 28 to hold the valve element 26 in engagement with the valve seat 24 and preclude fluid flow through the port 22. To thus close the valve in the released position of the armature 76, the spring 80 must be stronger than the spring 52 so that the latter will be overcome when the armature stem 74 moves into engagement with the valve stem 28.

As is customary in devices of this type, the magnetic attraction of the electromagnet 60, 66 is sufficient to maintain the armature 76 in engagement with the pole faces thereof when the thermocouple 68 is heated by a pilot flame. However, the magnetic field is not of sufficient strength to move the armature 76 from released to attracted position against the bias of the spring 80. Accordingly, reset means must be provided.

The reset means is here shown as comprising a rectilinearly movable shaft 82 slidably mounted in the annular element 50 in axial alignment with the valve stem 28. One end of the shaft 82 is arranged to engage the reduced end 42 of the valve stem 28 and the other end of the shaft 82 carries a generally cup-shaped push button 84. A spring 86 acting between the annular element 50 and the push button 84 serves to bias the shaft 82 away from the valve stem 28, movement of the shaft 82 under such bias being limited by a flange 88 formed on the push button 84 and arranged to abut a suitable shoulder formed on an apertured cap 90 which is threaded into the hollow shank 48. In its biased position, the push button 84 extends through the cap 90 and is thus easily accessible to an operator.

To effect the resetting of the electromagnetic device 56, the push button 84 is manually operated to move the same with its associated shaft 82 against the bias of the spring 86. Such movement of the shaft 82 moves the same into engagement with the valve stem 28 and moves the valve stem 28 downward, as viewed in the drawing, thereby positioning the valve element 26 away from the valve seat 24. Movement of the valve stem 28 will be transmitted directly to the armature stem 74 and armature 76 to move the latter against the bias of the spring 80 and into engagement with the pole faces of the magnet 60 where it will be retained if the thermocouple 68 is in its heated condition and energizing the magnet coils 66.

Briefly, the operation of the invention is as follows:

When the armature 76 is in its attracted position as shown in the drawing, movement of the valve element 26 relative to the valve seat 24 is under the control of the pressure responsive means 30 and fluid flow through the valve port 22 is thus regulated to maintain a predetermined pressure in the outlet passage 14.

Upon failure of the flame at the pilot burner 58, the thermocouple 68 will cool and deenergize the magnet coil 66 thus permitting the armature 76 to move under the bias of the spring 80 to its released position. In such position of the armature 76, the armature stem 78 is in engagement with the valve stem 28 and the spring 80, acting through the armature stem 74, serves to hold the valve element 26 firmly against the valve seat 24 to prevent fluid flow through the valve port 22.

To restore control of fluid flow to the pressure responsive means 30, the pilot burner 58 is relighted and, when the thermocouple 68 becomes heated, the hereinbefore described resetting operation is performed to return the armature 76 to its attracted position and thus free the valve element 26 for movement by the diaphragm 32.

It will be apparent from the foregoing that a single valve has been utilized to effect pressure regulation and flame failure shut off and the possibility of sticking valves inherent in infrequently operated safety shut off devices has been eliminated.

It will be obvious to those skilled in the art that the illustrated embodiment of this invention may be variously changed and modified, or features thereof embodied in other combinations than that illustrated without departing from the scope of the invention and that accordingly the disclosure herein is illustrative only and the invention is not limited thereto.

It is claimed and desired to secure by Letters Patent:

1. A control device comprising in combination, a valve body having inlet and outlet passages for fluid and a valve seat therebetween, an electromagnet carried by said body on the inlet side of said seat, an armature for said electromagnet and separable therefrom for movement between attracted and released positions, a valve member movable between open and closed positions relative to said seat for controlling fluid flow through said passages and being movable independently of said armature while said armature is in said attracted position, said valve member being on said inlet side of said seat, said armature being disposed on the inlet side of said seat and being operatively engageable with said valve member in said released position thereof, yieldable means for biasing said armature to said released position to hold said valve member in said closed position, means on the other side of said seat and responsive to fluid pressure in said outlet passage for actuating said valve member between said open and closed positions only while said armature is in said attracted position, thermoelectric means adapted for energizing said electromagnet but insufficiently to attract said armature from released position, and resetting means reciprocable relative to said body for moving said valve member against said bias to said open position to thereby move said armature to said attracted position and free said valve member for movement between said open and closed positions.

2. The control device as claimed in claim 1 wherein said pressure responsive means includes a movable partition with one side thereof exposed to fluid pressure in said outlet passage, an operative connection between said partition and said valve member for moving the latter toward said closed position upon an increase in said fluid pressure, and yieldable means biasing said valve member to open position, the first named yieldable means being of greater strength than the last named yieldable means.

3. A control device comprising in combination, a valve body having inlet and outlet passages for fluid and a valve seat therebetween, an electromagnet carried by said body on the inlet side of said seat, an armature for said electromagnet and separable therefrom for movement between attracted and released positions, a valve member movable between open and closed positions relative to said seat for controlling fluid flow through said passages and being movable independently of said armature while said armature is in said attracted position, said valve member being on said inlet side of said seat, said armature being disposed on the inlet side of said seat and being operatively engageable with said valve member in said released position thereof, yieldable means for biasing said armature to said released position to hold said valve member in said closed position, yieldable means for biasing said valve member to an open position, the first named yieldable means being of greater strength than the last named yieldable means, a diaphragm in said outlet passage having one side thereof subject to fluid pressure in said outlet passage, means connecting said diaphragm to said valve member for moving said valve member against said last named bias upon an increase in said fluid pressure, thermoelectric means adapted for energizing said electromagnet but insufficiently to attract said armature from said released position, and reciprocable reset means operable from the other side of said diaphragm and operatively engageable with said valve member to move the same to said open position to thereby move said armature to said attracted position and free said valve member for movement between said open and closed positions.

4. A control device comprising in combination, a valve body having inlet and outlet passages for fluid and a valve seat therebetween, an electromagnet carried by said body on the inlet side of said seat, an armature for said electromagnet and separable therefrom for movement between attracted and released positions, a valve member movable between open and closed positions relative to said seat for controlling fluid flow through said passages and being movable independently of said armature while said armature is in said attracted position, said valve member being on said inlet side of said seat, said armature being disposed on the inlet side of said seat and being operatively engageable with said valve member in said released position thereof, yieldable means for biasing said armature to said released position to hold said valve member in said closed position, a diaphragm in said outlet passage having one side thereof subject to fluid pressure in said outlet passage, means connecting said valve member to said diaphragm for moving said valve member toward said closed position upon an increase in fluid pressure in said outlet passage, yieldable means acting between said body and said diaphragm and biasing said valve member toward said open position, the first named yieldable means being of greater strength than the last named yieldable means, means for adjusting the bias of said last named means for regulating the fluid pressure in said outlet passage, thermoelectric means adapted for energizing said electromagnet but insufficiently to attract said armature from released position, and reciprocable reset means operable from the other side of said diaphragm and operatively engageable with said valve member to move the same to open position to thereby move said armature to said attracted position and free said valve member for movement between said open and closed positions.

5. A control device as claimed in claim 4 wherein said adjusting means includes an apertured thrust element threaded into said body and adapted to abut said last named yieldable means, said reset means including a reciprocable element journaled in said thrust element and operatively engageable with said diaphragm.

6. A control device comprising in combination, a valve body having inlet and outlet passages for fluid and a valve seat therebetween, condition responsive means carried by said body on the inlet side of said seat and including an element movable between active and inactive positions, a valve member movable between open and closed positions relative to said seat for controlling fluid flow through said passages and being movable independently of said element while said element is in said inactive position, said valve member being on said inlet side of said seat, said element being disposed on the inlet side of said seat and being operatively engageable with said valve member in said active position thereof for holding said valve member in said closed position, means on the other side of said seat and responsive to fluid pressure in said outlet passage for actuating said valve member between said open and closed positions only while said element is in said inactive position, said condition responsive means including mechanism for positioning said element in said active position upon a variation in said condition, and resetting means reciprocable relative to said body for moving said valve member to said open position to thereby move said element to said inactive position and free said valve member for movement between said open and closed positions.

References Cited in the file of this patent

UNITED STATES PATENTS

| 877,003 | Schulze | Jan. 21, 1908 |
| 2,212,762 | Wittmann | Aug. 27, 1940 |
| 2,253,670 | Wetzel | Aug. 26, 1941 |
| 2,437,488 | Hunter | Mar. 9, 1948 |
| 2,587,480 | Johnson | Feb. 26, 1952 |